(No Model.)
S. T. WILLIAMS.
WHEEL.
No. 305,770. Patented Sept. 30, 1884.
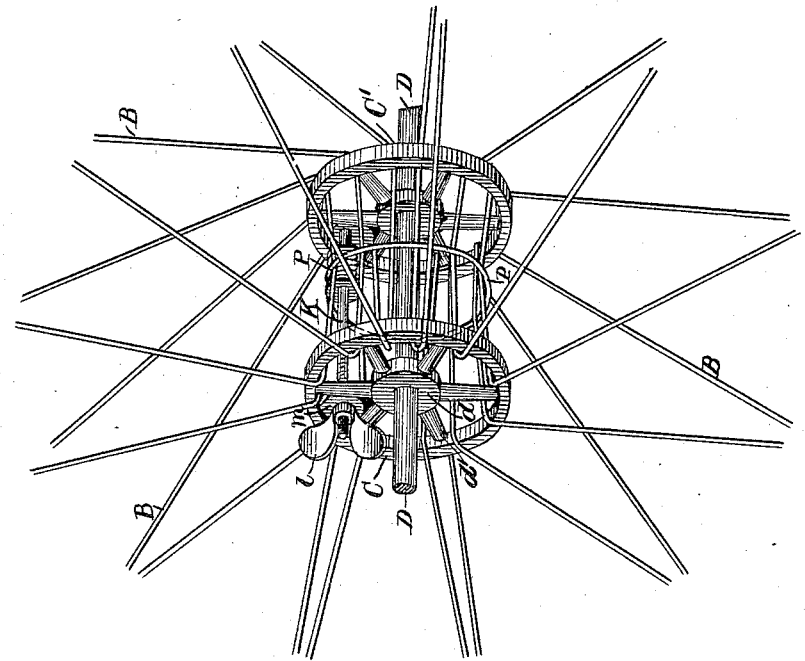
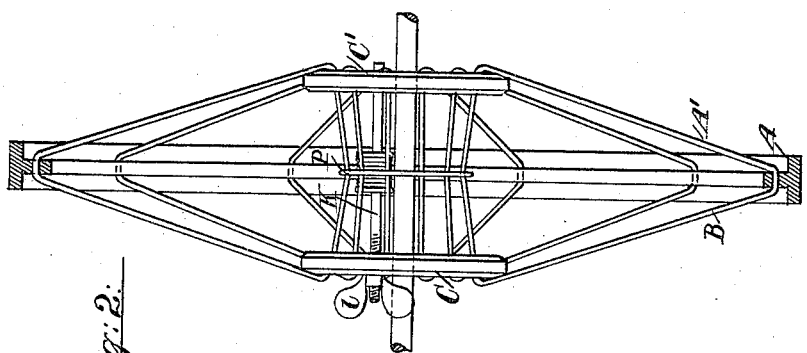
WITNESSES:
Geo. G. Jewett.
A. C. Webb.
INVENTOR
Saml T. Williams
BY Ernest ____
ATTORNEY

UNITED STATES PATENT OFFICE.

SAMUEL T. WILLIAMS, OF RED BANK, ASSIGNOR TO THE WILLIAMS TENSION WHEEL COMPANY, OF NEWARK, NEW JERSEY.

WHEEL.

SPECIFICATION forming part of Letters Patent No. 305,770, dated September 30, 1884.

Application filed February 20, 1884. (No model.)

*To all whom it may concern:*

Be it known that I, SAMUEL T. WILLIAMS, a citizen of the United States, residing at Red Bank, in the county of Monmouth and State of New Jersey, have invented certain new and useful Improvements in Wheels, of which the following is a full, clear, and exact description.

This invention relates to that class of wheels in which the spokes are of wire or other suitable strips of flexible material, and are adapted to have their tension varied as circumstances may require.

The invention consists in novel means for varying the tension of the spokes, and so increasing or diminishing the stiffness or rigidity of the wheel, substantially as hereinafter particularly set forth and claimed.

In the accompanying drawings, in the two figures of which similar letters of reference indicate like parts, Figure 1 is a perspective view of my wheel with the rim removed, and Fig. 2 is a vertical cross-section of the rim, the hub being in elevation.

A is the rim, having the felly A' integral therewith by preference, and made substantially as in the parent invention shown in my application, Serial No. 83,695, filed February 1, 1883.

B B are spokes, consisting of loops of wire or other strips of flexible material attached to the rim, after having been first passed through the wheel-like halves C C' of the wheel-hub. This hub is composed of the halves C C', each having a hub, $d$, fixed to the axle D, a rim, $d'$, and spokes $a$, connecting said hubs and rims. This hub differs from that shown in the referred-to application in that both its halves are fixed to the axle or shaft D and are not adjustable on or movable toward and from each other by it.

The tension of the spokes is regulated by means as follows: K designates a rod, one end of which bears in a recess in the portion $d$ of the hub-half C, and the other end projects through a slot in the hub $d$ of the other half, and is provided with a thumb-piece, $l$. $m$ is a pawl fixed to the exterior of the portion $d$ of half C', and adapted to engage with a series of teeth, $n$, cut on the rod K. A spool, $o$, is fixed to the rod K at its center, or equidistant from the hub-halves, and has attached to it a binding wire or band, $p$, which is first passed around the portion of the spokes contained between the hub-halves, and its ends then made fast to the spool by being passed through a hole in it from opposite sides.

It is obvious that rotating the rod revolves the spool and draws the binder onto it, hence contracting the diameter of such binder, and consequently drawing the spoke-loops toward a common center within the hub against the extending influence of the rims $d'$ $d'$. The pawl $m$, engaging the teeth $n$ on the rod K, holds the given tension on the spokes. The release of the pawl and the opposite rotation of the shaft will free the spokes of tension.

What I claim as my invention, and desire to secure by Letters Patent, is—

The combination, with the rim, the loop-like wire spokes, the hub composed of halves C C', through which the spokes are looped, fixed to the shaft or axle, the binder $p$, embracing the looped ends of the spokes between the hub-halves, and means to contract and expand said binder to vary the tension on the spokes, substantially as shown and described.

In testimony whereof I have hereunto set my hand this 9th day of February, A. D. 1884.

SAMUEL T. WILLIAMS.

Witnesses:
ARTHUR C. WEBB,
ERNEST C. WEBB.